(12) United States Patent
Cao

(10) Patent No.: US 6,721,512 B1
(45) Date of Patent: Apr. 13, 2004

(54) HIGH SPEED JITTER CORRECTION AND ADAPTIVE CHROMATIC DISPERSION COMPENSATION IN OPTICAL DISPERSION COMPENSATION IN OPTICAL SYSTEMS USING RZ FORMAT

(75) Inventor: Xiang-Dong Cao, Boca Raton, FL (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/517,151

(22) Filed: Mar. 2, 2000

(51) Int. Cl.[7] .................. H04B 10/00; H04B 10/12; H04B 10/16
(52) U.S. Cl. .................. 398/159; 398/147; 398/175
(58) Field of Search .................. 359/158, 161, 359/176; 398/175, 147, 159, 81

(56) References Cited

U.S. PATENT DOCUMENTS

| | | | |
|---|---|---|---|
| 4,831,637 A | 5/1989 | Lawrence et al. | 357/118 |
| 5,425,060 A | 6/1995 | Roberts et al. | 375/371 |
| 5,452,333 A | 9/1995 | Guo et al. | 375/371 |
| 5,608,757 A | 3/1997 | Smith et al. | 375/229 |
| 5,710,649 A | 1/1998 | Mollenauer | 359/123 |
| 5,757,529 A * | 5/1998 | Desurvire et al. | 398/178 |
| 5,801,862 A * | 9/1998 | Desurvire et al. | 398/80 |
| 6,104,515 A * | 8/2000 | Cao | 359/161 |
| 6,342,962 B2 * | 1/2002 | Marcerou et al. | 398/146 |

FOREIGN PATENT DOCUMENTS

WO    WO 96/27956    * 9/1996

OTHER PUBLICATIONS

M. Rochette et al., "Polarization Mode Dispersion Compensation of Chirped Bragg Gratings Used as Chromatic Dispersion Compensators", Electronics Letters, Feb. 17, 2000.*

Article entitled "Random walk of coherently amplified solitons in optical fiber transmssion", by P. Gordon et al., Optical Letters, vol. 11, No. 10, pp. 665–667, 1996.

Article enetiled "Long–range interaction of solitons in ultra–long communication systems", by E.M. Dianov et al., 1993, Soviet Lightwave Communication, vol. 1, pp. 235–246, 1991.

* cited by examiner

*Primary Examiner*—Jason Chan
*Assistant Examiner*—Shi K. Li
(74) *Attorney, Agent, or Firm*—Hunton & Williams LLP

(57) ABSTRACT

A compensation arrangement compensates for data signal changes from one of a group consisting of timing jitter dispersion and adaptive chromatic dispersion in an optical signal using a temporal imaging technique. An optical data input signal to the compensation arrangement includes a data pulse for each bit of data that have been subjected to a data signal change. In the compensation arrangement, a clock recovery arrangement generates an electrical clock output control signal including a predetermined phase modulation depth and phase and a data rate of the received optical input data signal. A phase modulator is responsive to the optical input data signal and the electrical clock output control signal from the clock recovery arrangement for generating an optical output signal. In this optical output signal, the phase of the data signal change associated with each data bit is delayed by a predetermined amount. A dispersive unit introduces a predetermined amount of dispersion to the data signal change components in the optical output signal from the phase modulator for generating an output optical signal from the compensation arrangement wherein the data signal change for each data bit is compensated for.

21 Claims, 5 Drawing Sheets

TIME (20ps/div)

TIME (20ps/div)

HIGH SPEED JITTER CORRECTION AND ADAPTIVE CHROMATIC DISPERSION COMPENSATION IN OPTICAL DISPERSION COMPENSATION IN OPTICAL SYSTEMS USING RZ FORMAT

FIELD OF THE INVENTION

The present invention relates to method and apparatus for providing high-speed timing jitter correction or adaptive chromatic dispersion compensation for optical communication systems using a Return-To-Zero (RZ) modulation format.

BACKGROUND OF THE INVENTION

Wavelength Division Multiplexing (WDM) has become a most effective technology for high capacity optical transmission systems. However, due to a finite optical bandwidth, it is desirable to be able to use more channels with smaller channel separations. In this regard, it was realized that a Return-To-Zero (RZ) modulation format has the benefit of higher spectral efficiency. In other words, it is possible to pack more channels into a given optical total bandwidth compared to a more conventional Non-Return-To-Zero (NRZ) modulation format. One of the major impairments for RZ or Soliton systems is the so-called "timing jitter", which term describes the fluctuations of the arrival time of the signal bits. A soliton is defined as a solitary wave that maintains its shape and velocity and does not widen or disperse in a normal way. There are several major causes for timing jitters in optical amplified transmission systems.

A first cause is the so-called Gordon-Haus jitter which is caused by optical amplifier noise as is described in the article entitled "Random walk of coherently amplified solitons in optical fiber transmission" by P. Gordon et al. in *Optic Letters*, Vol. 11, No. 10, at pages 665–667, 1986. A second cause is acoustic jitter which is caused by an acoustic wave generated by an optical signal as is described in the article entitled "Long-range interaction of solitons in ultra-long communication systems", by E. M. Dianov et al. in *Soviet Lightwave Communications*, Vol. 1, at pages 235–246, 1991. A third cause is the jitter that is caused by a nonlinear interaction among wavelength division multiplexed (WDM) channels. This third cause is usually a dominating factor among other timing jitters. A fourth cause is a soliton collision between adjacent bits of a single channel. This kind of nonlinear interaction is also found in both dispersion-managed soliton (DMS) systems and conventional Return-to Zero (RZ) systems. There are other sources of timing jitter such as jitter coming from transmitter electronics, and jitter transferred from electronic interfaces. The combined effect of nonlinear interaction between different wavelength channels and the random birefringence of transmission fibers also causes timing jitter.

An important characteristic of jitter is the frequency bandwidth of the jitter. It is possible to reduce the effect of timing jitter by improving a receiver's design for situations in which the timing jitter happens in a time scale much longer than the bit period. In other words, the bandwidth of the jitter is much smaller than the bit rate. Many techniques have been used to cope with low bandwidth jitter, especially for conventional non-return-to-zero (NRZ) systems. In this regard see, for example, U.S. Pat. No. 5,608,757 (D. M. Smith et al.), issued on Mar. 4, 1997, U.S. Pat. No. 5,452,333 (B. Guo et al.) issued on Sep. 19, 1995, U.S. Pat. No. 5,425,060 (R. D. Roberts et al.) issued on Jun. 13, 1995, and U.S. Pat. No. 4,831,637 (V. B. Lawrence et al.) issued on May 16, 1989. The problem with these prior art techniques is that they do not work with the Return-To-Zero (RZ) format, especially for situations in which the jitter bandwidth is comparable to the bit rate.

Based on an observation that the timing jitter caused by soliton collisions is not random but is data pattern dependent, U.S. patent Ser. No. 5,710,649 (L. F. Mollenauer), issued on Jan. 20, 1998, describes a technique to cope with such non-random jitter. In Mollenauer, two parallel resonators are used to track variations in data patterns or timing jitter in a receiver. Although the tolerable jitter bandwidth was significantly improved compared to traditional methods mentioned hereinabove, the jitter bandwidth is still much smaller than the realistic jitter bandwidth in many applications. For example, in a 10 Gbit/sec. optical transmission system (e.g., OC192 SONET, or equivalent) using the RZ modulation format can have jitter components well beyond one GHz, while the Mollenauer method can only cope with a jitter component of about 200 MHz.

It is desirable to provide a technique for the transmission of digital optical signals, and more particularly, a technique for the transmission of digital optical signals, such as solitons or Return-To-Zero pulses, which compensates for timing jitter, polarization-mode dispersion, or third-order chromatic dispersion in single channel and multi-channel high speed optical transmission systems.

SUMMARY OF THE INVENTION

Viewed from one aspect, the present invention is directed to a compensation arrangement for receiving an optical input data signal comprising data pulses for each bit of data that have been subjected to a data signal change due to one of a group consisting of timing jitter and chromatic dispersion. The compensation arrangement comprises a clock recovery arrangement, a phase modulator, and a dispersive unit. The clock recovery arrangement generates an electrical clock output control signal including a predetermined phase modulation depth and phase and a data rate of the received optical input data signal. The phase modulator is responsive to the optical input data signal received by the compensation arrangement and the electrical clock output control signal from the clock recovery arrangement for generating an optical output signal wherein the phase of the data signal change associated with each data bit is delayed by a predetermined amount. The dispersive unit introduces a predetermined amount. The dispersive unit introduces a predetermined amount of dispersion to the pulse in the optical output signal from the phase modulator for generating an output optical signal from the compensation arrangement wherein the data signal change for each data bit are in phase.

Viewed from another aspect, the present invention is directed to a compensation arrangement for receiving an optical input data signal comprising a data pulse for each bit of data that have been subjected to a data signal change due to one of a group consisting of timing jitter and chromatic dispersion. The compensation arrangement comprises a clock recovery arrangement, a phase modulator, and a dispersive unit. The clock recovery arrangement receives the optical input data signal and generates therefrom an electrical clock output control signal comprising both a frequency corresponding to a bit data rate of the optical input data signal and a predetermined phase modulation depth and phase. The phase modulator receives the optical input data signal and modulates the phase thereof in accordance with the electrical clock output control signal from the clock recovery arrangement including a phase difference of 90 degrees from that of the optical input data signal. The phase modulator generates an optical output signal wherein the phase of the data signal change component associated with each data bit is delayed by a predetermined amount. The dispersive unit introduces a predetermined amount of dispersion to the data pulses in the optical output signal from the phase modulator for generating an output optical signal from the compensation arrangement wherein the data pulses for each data bit are in phase with clock pulses generated in the clock recovery arrangement.

Viewed from still another aspect, the present invention is directed to a method of providing compensation to each bit of data that has been subjected to data signal changes due to one of a group consisting of timing jitter and chromatic dispersion in data signals propagating in an optical transmission system comprising the following steps. In a first step, an optical signal is received including data pulses that have been subjected to a data signal changes. In a second step, an electrical clock output control signal is generated comprising both a frequency corresponding to a bit data rate of the optical input data signal and a predetermined phase modulation depth and phase in a clock recovery arrangement from the received optical input data signal. In a third step, the phase of the optical input data signal received in step (a) is modulated in a phase modulator in accordance with the electrical clock output control signal generated in the first step wherein said phase is a phase difference of 90 degrees from that of the optical input data signal. Still further, the phase modulator generates an optical output signal wherein the phase of the data signal change component associated with each data bit is delayed by a predetermined amount. In the fourth step, a predetermined amount of dispersion is introduced to the data pulses in the optical output signal from the phase modulator by a dispersive unit for generating an output optical signal from the compensation arrangement wherein the data signal change for each data bit is compensated for.

The invention will be better understood from the following more detailed description taken with the accompanying drawings and claims.

DETAILED DESCRIPTION

Figure 1:
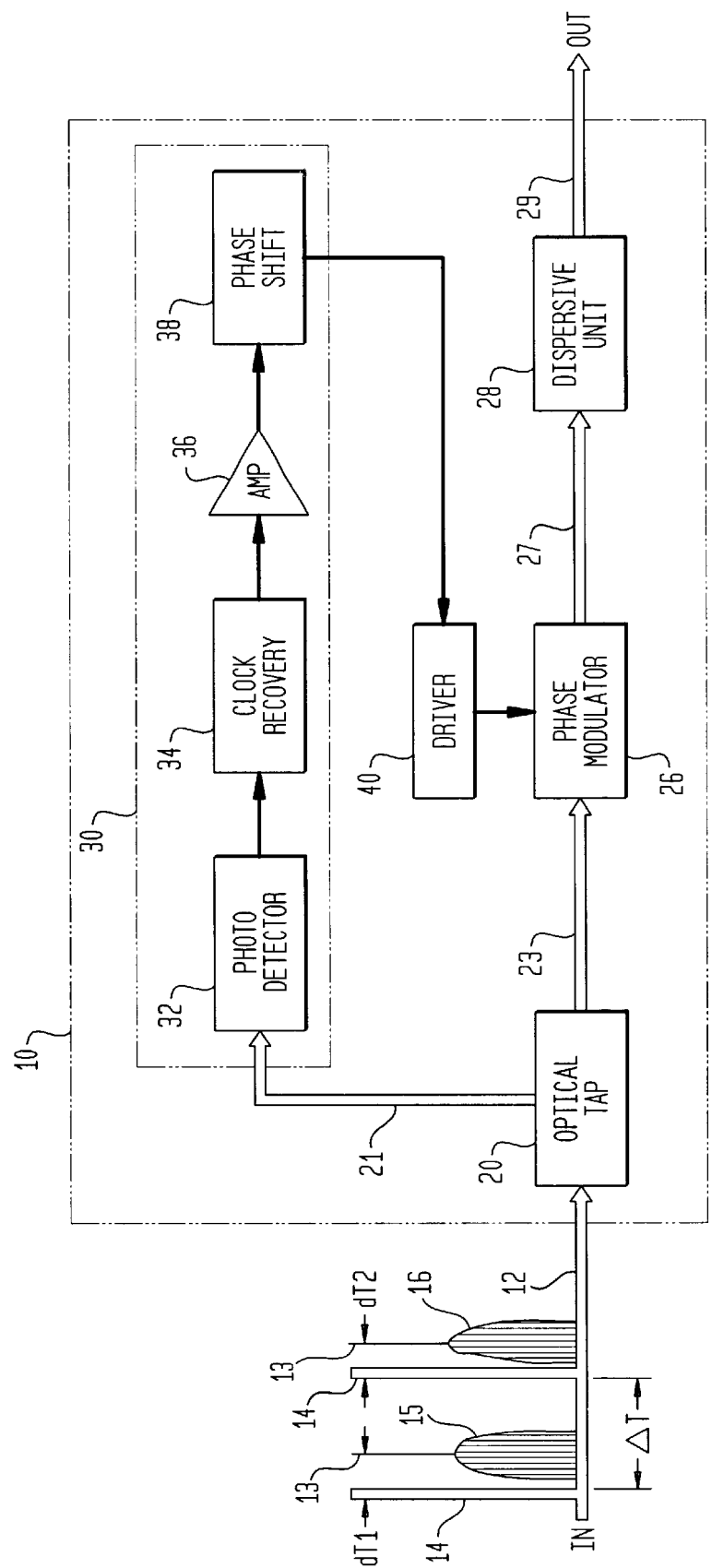
FIG. 1 shows a block diagram of a compensation arrangement for compensating for either timing jitter or chromatic dispersion using temporal imaging in an optical transmission system in accordance with a present invention.

Referring now to FIG. 1, there is shown within a dashed line rectangle a block diagram of a compensation arrangement 10 using temporal imaging in an optical transmission system which can be used to compensate for one of a group consisting to timing jitter and chromatic dispersion compensation in accordance with the present invention. The compensation arrangement 10 is shown as receiving an input signal subjected to timing jitter. The compensation arrangement 10 is adapted to receive a continuous stream of optical pulses (of which only first and second exemplary optical pulses 15 and 16 are shown) via an optical transmission line 12 with a different timing jitter for each of first and second pulses 15 and 16. Bold lines 14 represent a correct temporal position for each of the first and second optical pulses 15 and 16 in time, and the thinner lines 13 extending from the center of each of the first and second pulses 15 and 16 indicates an actual timing of that pulse. The bold lines 14 are uniformly distributed in time with a period defined by "delta T", and the timing jitter from the desired associated timing position shown by the bold line 14 for each of the first and the second exemplary pulses 15 and 16 are defined by "dT1" and "dT2", respectively.

The compensation arrangement 10 comprises an optical tap 20, a polarization-independent phase modulator 26, a dispersive unit 28, and a clock recovery unit 30 (shown within a dashed line rectangle). The optical tap 20 is coupled via transmission line 12 to receive an optical data signal comprising the first and second optical data pulses 15 and 16 which each include a separate timing jitter dT1 and dT2, respectively, from a remote transmitter (not shown). Transmission line 12 is typically a single mode optical fiber. The optical tap 20 is coupled to direct a first portion of the received optical signal to an input of the clock recovery unit 30 via an optical fiber 21, and to direct a remaining second portion of the received optical signal to a first input of the phase modulator 26 via an optical fiber 23. The phase modulator 26 is also coupled to receive an electrical feedback control signal from the clock recovery unit 30 at a second input thereof. As will be described hereinafter, a phase difference between a bit stream received from the optical tap 20 via optical path 23 and the phase modulator 26 is 90 degrees. An output from the phase modulator 26 is coupled to an input of the dispersive unit 28 via an optical fiber 27. The dispersive unit 28 can comprise any suitable arrangement as, for example, a piece of optical fiber with a certain amount of dispersion, or a chirped optical fiber Bragg grating. An output of the dispersive unit 28 is provided as the output from the compensation arrangement 10.

The clock recovery unit 30 can comprise any suitable clock recovery arrangement. An exemplary arrangement for the clock recovery unit 30 is shown in FIG. 1 and comprises a high-speed photodetector (PHOTO DETECTOR) 32, a clock recovery circuit (CLOCK RECOVERY) 34, a radio frequency (RF) amplifier (AMP) 36, an RF phase shifter (PHASE SHIFT) 38, and a modulator driver (DRIVER) 40. Bold solid lines between elements in FIG. 1 depict optical paths while non-bold solid lines between elements depict electrical paths.

In operation, the optical signal propagating through optical fiber 12 comprises an optical bit stream containing first and second optical pulses 15 and 16 for a separate bit of data. Each of the first and second optical pulses 15 and 16 has a certain amount of timing jitter dT1 and dT2, respectively, from its correct temporal position 14 at its arrival time at the compensation arrangement 10. In the compensation arrangement 10, the optical tap 20 divides the received optical signal into a first portion for transmission over optical fiber 21 to an input of the clock recovery unit 30, and into a second portion for transmission over optical fiber 23 to a first input of the phase modulator 26. The phase modulator 26, at a second input thereof, receives a feedback control signal generated by the clock recovery unit 30.

In the clock recovery unit 30, the first and second data pulses 15 and 16 including their separate timing jitter dT1 and dT2, respectively, and subsequent pulses with timing jitter are received from the optical tap 20 at the input to the photodetector 32 via optical fiber 21 for each bit of the optical data stream. The photodetector 32 generates one equivalent electrical output pulse for each received bit of the data stream. Each electrical output pulse from the photodetector 32 is coupled to an input of the clock recovery circuit 34. The electrical input signal to the clock recovery circuit 34 from the photodetector 32 is a digital signal at the bit rate of the received optical signal. It contains all of the data information, and covers the whole spectrum of the information. The clock recovery circuit 34 is basically a filter which filters out a signal at a predetermined frequency such as, for example, 10 GHz, which corresponds to the data bit rate. The digital input signal to the clock recovery circuit 34 is used to generate a sinusoidal output clock signal at a predetermined frequency which is the bit rate of the optical signal received by the compensation arrangement 10 via the optical fiber 12. Effectively, the clock recovery circuit 34 acts like a fly-wheel and takes an average over many pulses to generate an output signal at a constant frequency. The amplifier 36 amplifies the output clock signal from the clock recovery circuit 34 by a predetermined amount and delivers the amplified clock signal to the phase shifter 38. The phase shifter 38 changes (adjusts) the phase of the sinusoidal signal by a predetermined amount to provide a correct phase information when the electrical clock feedback signal is provided to the phase modulator 26 via the phase modulator driver 40.

The phase modulator 26 receives the data pulses 15 and 16 from the optical tap 20 via the optical fiber 23. When the feedback signal from the clock recovery unit 30 is properly adjusted to have the correct phase information, there is a 90 degree phase difference between the optical signal received from the optical tap 20 and the electrical feedback signal received from the clock recovery unit 30. The phase modulator 26 is driven by the recovered clock signal provided by the driver 40. The phase modulator 26 modulates each of the data pulses 15 and 16 and all subsequent data pulses so that all data pulses see the same amount of phase modulation. However, the sinusoidal modulation has a different slope where, for example, a left hand side has a positive slope and a right hand side has a negative slope. Therefore, it is desired to provide a delay so that the data pulses 15 and 16 are situated on, for example, a left or right hand side of center which corresponds to a correct temporal position 14 of each pulse 15 and 16. This permits the dispersive unit to bring the data pulses to their correct temporal position 14 at the output of the compensation arrangement 10. The phase modulator 26 effectively introduces a delay into the optical signal received from the optical tap 20 so that each of the data pulses are centered on an axis which corresponds to the correct temporal position 14. Then, when each of the first and second data pulses 15 and 16 pass through the dispersive unit 28, the first and second data pulses 15 and 16 will each become aligned with their correct temporal positions 14. This compensates for the timing jitter in the optical signal received by the compensation arrangement 10 via optical fiber 12.

The elements of the compensation arrangement 10 are commercially available elements. For example, a polarization independent Lithium Niobate phase modulator 26 is available from, for example, Uniphase located at 1289 Blue Hills Avenue, Bloomfield, Conn. 06002. Still further, a polarization-independent phase modulator can be formed from first and second Lithium Niobate waveguides that are interspersed between at least three electrodes wherein at least one of the electrodes is coupled to receive a driving voltage for generating a traveling wave therein. An optical channel signal is received from a remote source at a first end of the first Lithium Niobate waveguide, and a second end of the second Lithium Niobate waveguide to provide an optical output signal. A cross splice/delay line means interconnects a second end of the first Lithium Niobate waveguide to a first end of the second Lithium Niobate waveguide.

It is easier to understand the temporal imaging functionality between dispersion and diffraction. Mathematically, dispersion and diffraction can be described by a same partial differential equation as is well known in the art. The only difference is that dispersion is one-dimensional, while diffraction is two-dimensional. Therefore, there exists an analogy between bulk optics, spatial imaging, dispersion, and temporal imaging. Propagation along dispersion optics corresponds to propagation in space, a phase modulation in time corresponds to an optical component with a surface profile the same as the phase profile. For example, for linear phase modulation (in time), the optical component is a prism, for positive and negative phase modulation (in time) the optical component is a positive and a negative lens, respectively, and for sinusoidal phase modulation (in time) the optical component is a grating.

Figure 2:
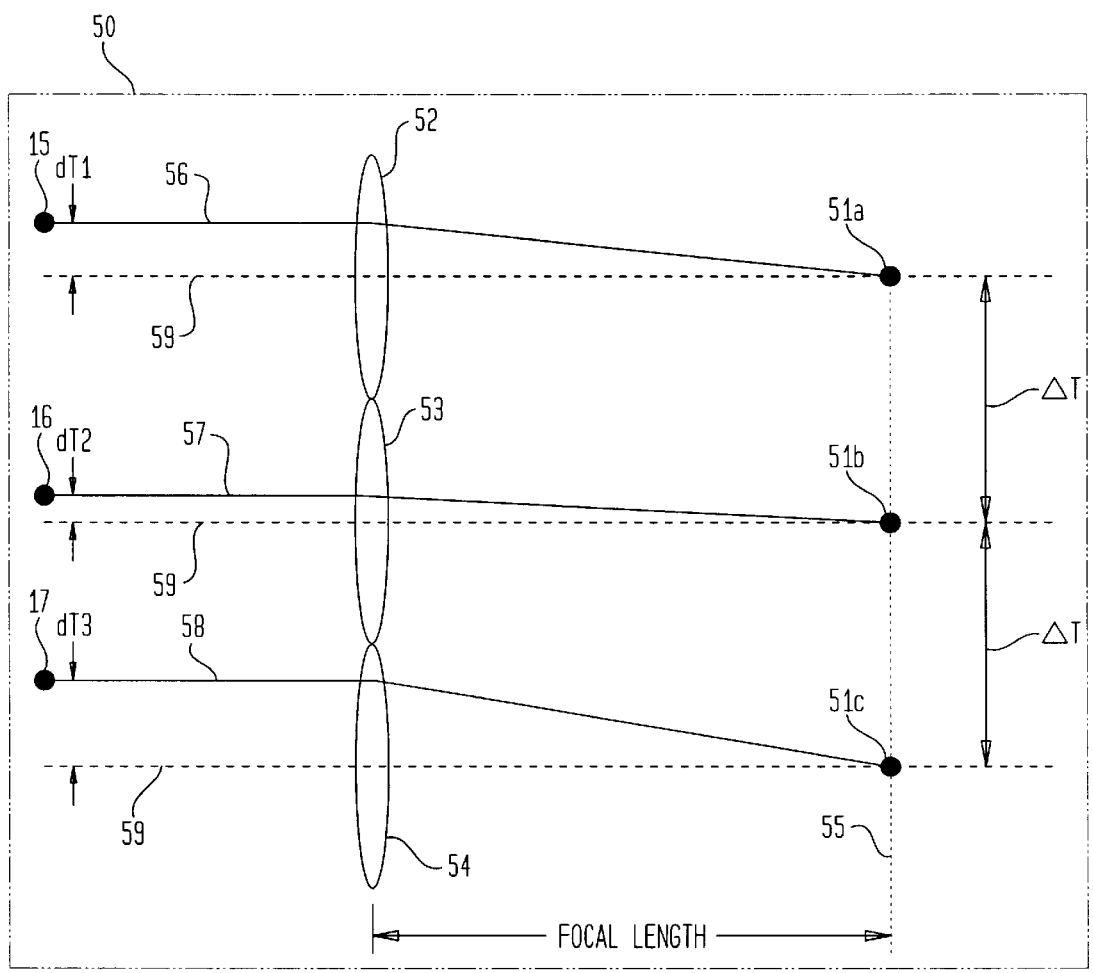
FIG. 2 shows an exemplary optical system corresponding to the functioning of the compensation arrangement of FIG. 1.

Referring now to FIG. 2, there is shown an exemplary optical system 50 (shown within a dashed line rectangle) corresponding to, and for explaining, the functioning of the temporal imaging compensation arrangement 10 of FIG. 1. The optical system 50 comprises first, second, and third lens 52, 53, and 54 aligned in a vertical plane, and a focal plane 55 defined by the lenses 52, 53, and 54. The phase modulator 26 of FIG. 1 corresponds to the lenses 52, 53, and 54, with each of the lenses 52, 53, and 54 corresponding to one time period (delta T) of phase modulation. A first, second, and third data pulse 15, 16, and 17 (not shown but represented by solid dots) having a timing jitter delay of dT1, dT2, and dT3, respectively, are received at different times. Each of the first, second, and third pulses 15, 16, and 17 are represented by the solid lines 56, 57, and 58, respectively, to the left side of the lenses 52, 53, and 54, respectively. The timing jitter of each of the first, second, and third pulses 15, 16, and 17 corresponds to the distance from each of the dots to the horizontal line 59 crossing the center of the associated one of the temporal lenses 52, 53, and 54, respectively. For purposes of illustration only, the first data pulse 15 has a timing jitter delay of dT1 and is shown as only impinging the lens 52, the second data pulse 16 has a timing jitter delay of dT2 and is shown as only impinging the lens 53, and the third data pulse 17 has a timing jitter delay of dT3 and is shown as only impinging the lens 54. At the focal plane 56, the lenses 52, 53, and 54 cause the first, second, and third data pulses 15, 16, and 17, respectively, to be brought together with a respective finite spot size 51a, 51b, and 51c that corresponds to a minimum pulse width. As was indicated hereinbefore, a phase difference between the bit stream and the phase modulator 26 is 90 degrees so that the center of each of the first, second, and third data bits 15, 16 and 17 are aligned to the center (vertical axis 59) of the positive lenses 52, 53, and 54, respectively. Once the consecutive data pulses 15, 16 and 17 are aligned on the focal plane 55, the data pulses will have a correct temporal position 14 separated by a predetermined time of "delta T". Therefore, as long as the clock feedback signal from the clock recovery unit 30 is synchronized with the bit stream, the timing jitter (dT) will be compensated for each data pulse without a direct timing jitter measurement.

As long as the clock from the clock recovery arrangement 30 is synchronized with the incoming bit stream, any timing jitter (dT) will be compensated for regardless of the magnitude of the jitter up to an upper limit. Since the phase modulator is polarization and timing jitter insensitive, this temporal imaging technique works for any polarization or timing jitter. Still further, since the timing jitter compensation is done in the time domain bit by bit, the compensating speed is equal to the bit rate. In other words, the bandwidth of timing jitter correction is equal to the bit rate.

There is an optimal amount of dispersion required for the dispersive unit 28 of FIG. 1 for a given phase modulation depth. Basically, the larger the phase modulation depth, the smaller the required dispersion. This feature makes it possible to optimize the design of the timing jitter compensation unit 10 in terms of cost and physical size by balancing the phase modulation depth and the dispersion provided in the dispersive unit 28. Phase modulation depth is defined with reference to the sinusoidal clock feedback signal provided by the clock recovery unit 30 which is amplified to a certain amplitude by the amplifier 36 therein. Changing the amplification of the amplifier 36 changes the output signal amplitude therefrom from some minus value to a plus value, or vice versa. The difference in the minus to plus peak-to-peak amplitude value is defined as the phase modulation depth. The feedback signal generated in the clock recovery unit 30, and provided to the phase modulator 26, is an electrical signal which has to be changed to correspond to the actual phase experienced by the phase modulator 26 in the optical signal from the optical tap 20 because there is a conversion from the electrical feedback signal to the optical phase modulation. The phase shifter 38 in the clock recovery unit 30 is the element that is adjusted to provide an optimal relationship between the phase depth and the amount of dispersion required in the dispersive unit 28. If an increase in the amount of phase depth is desired, then less dispersion is needed, but this requires a more powerful amplifier. Therefore, in practice it depends on which is easier and cost effective to implement that determines what values of phase depth and dispersion are provided.

The maximum jitter that can be compensated for by the present compensation arrangement 10 is dependent upon the pulse width used. The smaller the pulse width, the larger the differential group delay (DGD) that can be compensated. This is due to the fact that the pulse energy is more confined within one bit period for a smaller pulse width, thus smaller inter-symbol interference (ISI).

Phase modulation Φ can be expressed by the equation $$\Phi = \Phi_0 p(2\pi f t), \quad (1)$$

where $\Phi_0$ is the depth of modulation, f is the modulation frequency, and p(2πft) is a periodical function of t with a periodicity of 1/f. A simplest waveform is, for instance, the cosine function $\Phi = \Phi_0 \cos(2\pi f t)$. Other waveforms can be used as well, but the cosine or sine waveforms are the easiest to implement in practice. For purposes of example, the cosine waveform will be used with f=10 GHz in the following example. Still further, the input optical pulses are modeled as Gaussian pulses shown by Equation (2) as follows:

$$E(t) = \exp[-0.5(t/t0)^2], \quad (2)$$

where t is time, t0 is a constant which is related to the pulse width given by t0=2/√[log(T)], and T is the full-width-at-half-maximum (FWHM) pulse width. Within each modulation period, the phase waveform can be approximated by the equation $$\Phi = \Phi_0/(2\pi f) - 2\pi^2 f^2 t^2 \quad (3)$$

which gives rise t0 an output electrical field defined by $$E(t) = \exp[-0.5(1+C^2)(t/t0)^2], \quad (4)$$

where $C = \Phi_0 2n^2 f^2 t^2$ and is a chirp parameter as defined in the book "Nonlinear Fiber Optics", by G. P. Agrawal, in Chapter 3. The required dispersion to fully compensate for timing jitter, polarization mode dispersion (PMD), or chromatic dispersion (including higher order dispersion) is given by the equation $$\beta\text{hu } 2L = (C/1+C)t0^2. \quad (5)$$

Figure 3:
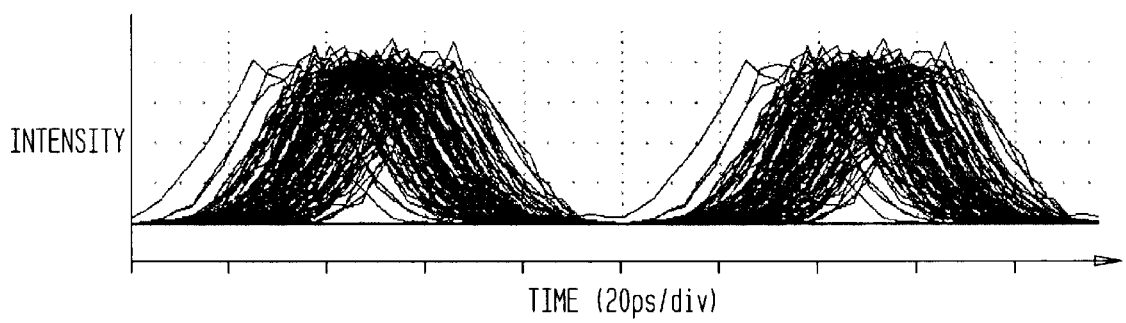
FIGS. 3 and 4 show computer simulated optical Eye diagrams before timing jitter compensation and after timing jitter compensation, respectively, for a 10 Gbit/sec. system with a pulse width of 15 picoseconds (ps) at a predetermined phase modulation depth, dispersion, and optical wavelength.
Figure 4:
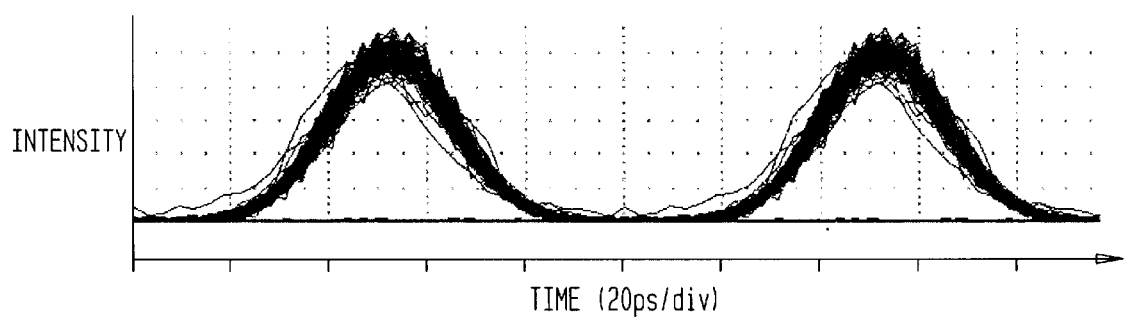

Referring now to FIGS. 3 and 4, there is graphically shown computer simulated optical Eye diagrams before timing jitter compensation (see FIG. 3) and after timing jitter compensation (see FIG. 4), respectively, for a 10 Gbit/sec. system with a pulse width of 15 picoseconds (ps) at a phase modulation depth of 210 degrees, a required dispersion of 210 picosecond/nanometer (ps/nm), and optical wavelength of 1550 nanometers (or 267 picoseconds$^2$), and an input signal having a random jitter of approximately 40 ps.

As is shown in FIG. 3, before timing jitter compensation, the Eye is almost closed, and as is shown in FIG. 4, the Eye is completely open after timing jitter compensation. It should also be noted that the peak power of the timing jitter compensated Eye in FIG. 4 is larger than the peak power of the uncompensated timing jitter Eye shown in FIG. 3. This is due to extra pulse compression caused by phase modulation, which further opens the Eye and improves system performance.

Figure 5:
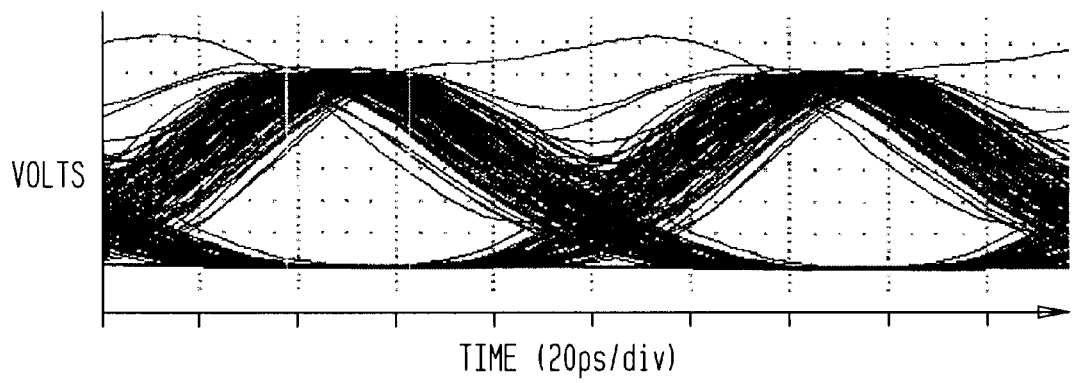
FIGS. 5 and 6 show computer simulated electrical Eye diagrams before timing jitter compensation and after timing jitter compensation, respectively, for a 10 Gbit/sec. system with a pulse width of 15 picoseconds (ps) at a predetermined phase modulation depth, dispersion, and optical wavelength.
Figure 6:
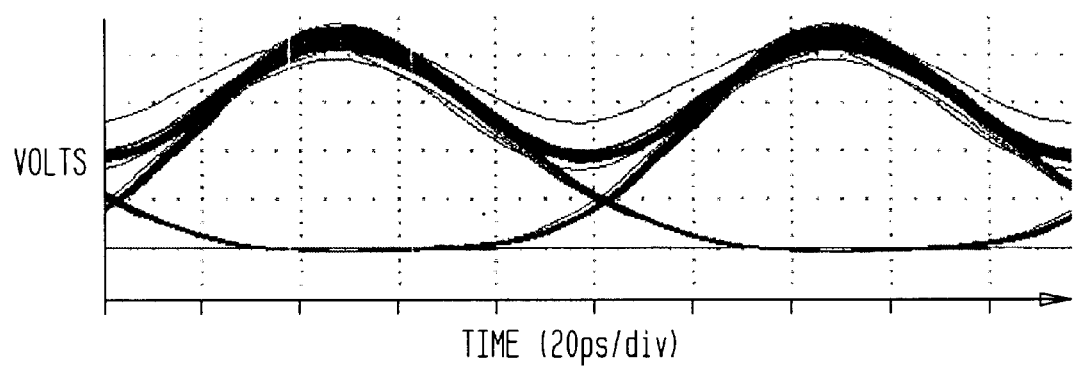

Referring now to FIGS. 5 and 6, there is graphically shown computer simulated electrical Eye diagrams before timing jitter compensation (see FIG. 5) and after timing jitter compensation (see FIG. 6), respectively, for the arrangement of FIG. 1 using a receiver (not shown) with an electrical filter bandwidth of 5.5 GHz (5$^{th}$ order Bessel filter). The Q factor/bit error rate (BER) has been improved from Q=8.03/BER2=2.43e−12 before compensation as is shown in FIG. 5, to Q=10.2/BER=1.26e−24 after compensation as is shown in FIG. 6, which is a 2 dB improvement in system performance.

Figure 7:
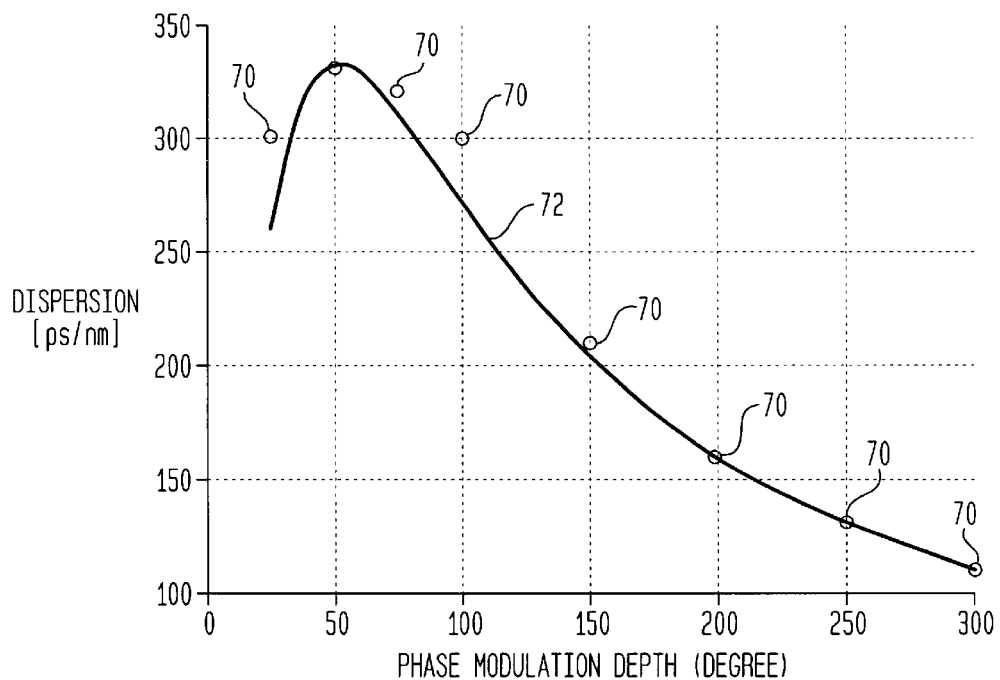
FIG. 7 is a graph showing a curve of a relationship of dispersion versus phase modulation depth as determined by a predetermined equation for optimizing a system bit error rate.

Referring now to FIG. 7, there is graphically shown a curve of a relationship of dispersion on the Y-axis in ps/nm versus phase modulation depth on the X-axis in degrees as determined by a predetermined equation for optimizing a system bit error rate. The relationship between the required dispersion and the modulation depth and provides theoretical predictions given by Equation (5). In FIG. 7, the small circles 70 represent system simulated data, while the continuous curve 72 is a theoretical prediction. The theoretical predictions shown by curve 72 substantially agree with system simulation data shown by the circles 70. Therefore, system designers can use this dependence to choose appropriate phase modulation depth and the required dispersion values. This flexibility can be valuable in optimizing system performance as well as component costs. The dispersion values are give in units of ps/nm, which can be converted to ps² based on a wavelength value of 1550 nm (approximately 1.27 Ps²).

The present invention can also be used to compensate for distortions caused by either polarization mode dispersion (PMD), or higher order chromatic dispersion,. It is well known that PMD causes an optical pulse to split into two sub-pulses with a certain delay between them. The third order chromatic dispersion (TOD) also causes an optical pulse to break into a series of secondary sub-pulses. Usually the first two pulses contain almost all of the energy, and it is sufficient to consider only the first two sub-pulses. There are several fundamental differences between PMD and TOD. PMD is statistic in nature, meaning that the amplitudes, as well as the delay, between the two sub-pulses are changing over time, while both relative amplitudes and separation between the two sub-pulses are fixed in time for TOD distortions. Since the present compensation arrangement 10 does not depend upon the input statistic, either random or deterministic, it is expected to work for either PMD and TOD compensation in the way described for timing jitter compensation.

Figure 8:
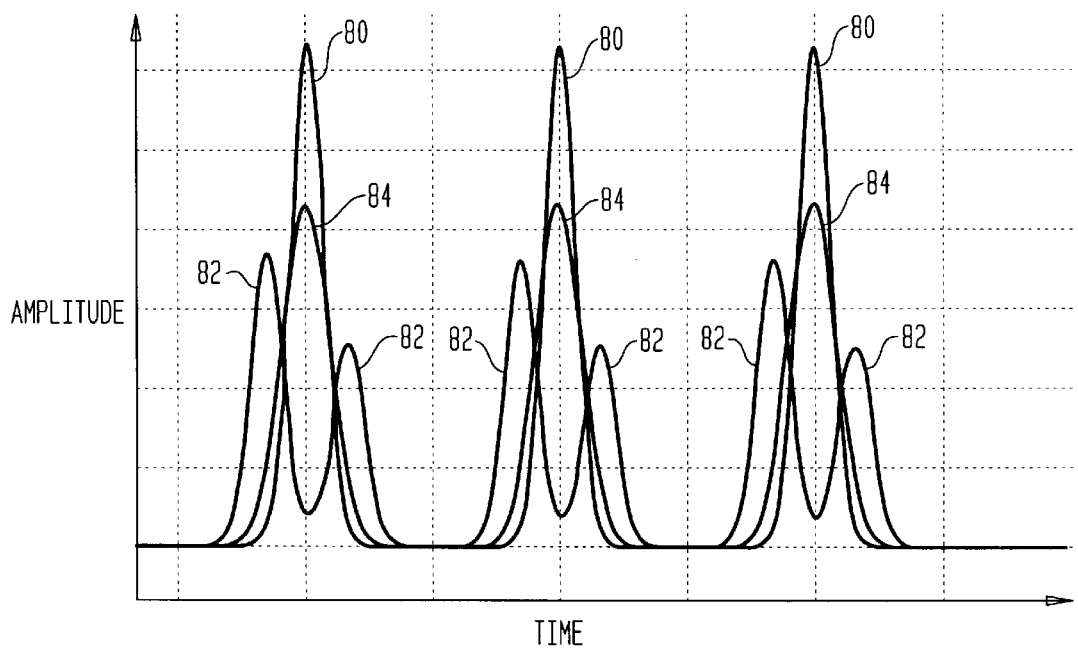
FIG. 8 graphically shows separate pulses versus time for clock locations, distorted pulses before compensation, and pulses after compensation for polarization mode dispersion (PMD) or third-order dispersion (TOD).

Referring now to FIG. 8, there is graphically shown separate pulses 80 for clock locations, distorted pulses 82 before compensation, and pulses 84 after compensation for polarization mode dispersion (PMD) or third-order dispersion (TOD). All of pulses 80, 82, and 84 are shown on a graph which has a Y-axis with units of amplitude, and an X-axis with units of time. More particularly, the pulses 80 are for the clock location, the pulses 82 are for the distorted pulses before compensation, and the pulses 84 are for the pulses after compensation. Each of the pulses 82 before compensation are distorted and contain two peaks for each clock location pulse 80, while the compensated pulses 84 are completely recovered and are concurrent with the each clock location pulse 80. The compensation arrangement 10 functions to compensate or chromatic dispersion in exactly the same manner as described hereinbefore for compensating for timing jitter.

In summary, timing jitter or chromatic dispersion compensation is performed in the optical domain and can be used together with standard high speed receivers. The compensation arrangement 10 does not rely on the input polarization state or the input timing jitter value. This important feature makes it possible to compensate for timing jitter or chromatic dispersion without active feedback control. Except for the clock recovery arrangement 30, timing jitter or chromatic dispersion compensation is almost passive in the sense that the compensation arrangement 10 does not depend on the input states. Since the timing jitter or chromatic dispersion compensation is performed at the speed of the data rate, it is extremely fast as, for example, 10 GHz for an OC192 SONET system and 40 GHz for an OC768 SONET system. The same compensation arrangement 10 can also be used to compensate for other types of distortions cause by, for example, polarization mode dispersion (PMD) and third-order chromatic dispersion (TOD). The compensation arrangement 10 can be integrated to reduce its physical size, and since there are no moving parts in the design, it is very reliable.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. A compensation arrangement comprising:
    an optical tap for receiving an optical input data signal comprising data pulses for each bit of data that have been subjected to data signal changes due to one of a group consisting of timing jitter and chromatic dispersion;
    a clock recovery arrangement, coupled to the optical tap, for generating an electrical clock output control signal having a predetermined phase modulation depth and phase and a data rate of the received optical input data signal;
    a phase modulator, coupled to the optical tap and the clock recovery arrangement, for modulating the phase of the optical input data signal based at least in part upon the electrical clock output control signal and for generating an optical output signal, wherein the phase of the electrical clock output control signal is 90 degrees from a phase of the optical input data signal modulated by the phase modulator, wherein a phase of the data signal changes associated with each data bit is delayed by a predetermined amount; and
    a dispersive unit, coupled to the phase modulator, for introducing a predetermined amount of dispersion to pulses in the optical output signal for generating an output optical signal from the compensation arrangement wherein the data signal changes for the data bits are in phase.

2. The compensation arrangement of claim 1 wherein the optical tap directs a first portion of the optical input data signal to an input of the clock recovery arrangement and a second portion of the optical input data signal to an input of the phase modulator.

3. The compensation arrangement of claim 1 wherein the clock recovery arrangement comprises:
    a photodetector for converting the optical input data signal into a corresponding electrical output signal wherein a digital pulse is provided for each bit of data in the optical input data signal;
    clock recovery circuitry for receiving the electrical output signal from the photodetector and generating a clock output signal that has a frequency corresponding to the bit data rate of the optical input data signal;
    an amplifier for receiving the clock output signal from the clock recovery circuitry, and for generating an amplified output signal having a predetermined amplitude that corresponds to a predetermined phase modulation depth; and
    a phase shifter for receiving the amplified output signal from the amplifier and introducing a predetermined phase shift therein for generating the electrical clock output control signal for the phase modulator comprising both a frequency corresponding to a bit data rate of the optical input data signal and a predetermined phase modulation depth and phase.

4. The compensation arrangement of claim 1 wherein the dispersive unit comprises a predetermined length of an optical fiber comprising a predetermined amount of dispersion.

5. The compensation arrangement of claim 1 wherein the dispersive unit comprises a chirped optical fiber Bragg grating.

6. The compensation arrangement of claim 1 wherein compensation is performed at the speed of the bit data rate of the optical input data signal received by the optical tap.

7. The compensation arrangement of claim 1 wherein the electrical clock output control signal is independent of any data signal change measurement.

8. The compensation arrangement of claim 1 wherein the electrical clock output control signal is independent of any dynamic data signal change value.

9. A compensation arrangement comprising:
    an optical tap for receiving an optical input data signal comprising data pulses for each bit of data that have been subjected to data signal changes due to one of a group consisting of timing jitter and chromatic dispersion;

a clock recovery arrangement, coupled to the optical tap, for generating an electrical clock output control signal comprising both a frequency corresponding to a bit data rate of the optical input data signal and a predetermined phase modulation depth and phase;

a phase modulator, coupled to the optical tap and the clock recovery arrangement, for modulating the phase of the optical input data signal in accordance with the electrical clock output control signal from the clock recovery arrangement including a phase difference of 90 degrees from that of the optical input data signal, the phase modulator generating an optical output signal wherein the phase of the data signal change associated with each data bit is delayed by a predetermined amount; and a dispersive unit, coupled to the phase modulator, for introducing a predetermined amount of dispersion to data pulses in the optical output signal from the phase modulator for generating an output optical signal from the compensation arrangement wherein data pulses for data bits are in phase with clock pulses generated in the clock recovery arrangement.

10. The compensation arrangement of claim 9 wherein the optical tap directs a first portion of the optical input data signal to an input of the clock recovery arrangement and a second portion of the optical input data signal to an input of the phase modulator.

11. The compensation arrangement of claim 9 wherein the clock recovery arrangement comprises:

a photodetector for converting the optical input data signal into a corresponding electrical output signal wherein a digital pulse is provided for each bit of data in the optical input data signal;

clock recovery circuitry for receiving the electrical output signal from the photodetector, and for generating a clock output signal that has a frequency corresponding to the bit data rate of the optical input data signal;

an amplifier for receiving the clock output signal from the clock recovery circuitry, and for generating an amplified output signal having a predetermined amplitude corresponding to a predetermined phase modulation depth; and a phase shifter for receiving the amplified output signal from the amplifier and introducing a predetermined phase shift therein for generating the electrical clock output control signal for the phase modulator comprising both a frequency corresponding to a bit data rate of the optical input data signal and a predetermined phase modulation depth and phase.

12. The compensation arrangement of claim 9 wherein the dispersive unit comprises a predetermined length of an optical fiber comprising a predetermined amount of dispersion.

13. The compensation arrangement of claim 9 wherein the dispersive unit comprises a chirped optical fiber Bragg grating.

14. The compensation arrangement of claim 9 wherein data signal change compensation is performed at the speed of the bit data rate of the optical input data signal received by the optical tap.

15. A method of providing compensation in an optical transmission system comprising the steps of:

(a) receiving an optical input data signal including data pulses for each bit of data that have been subjected to data signal changes due to one of a group consisting of timing jitter and chromatic dispersion;

(b) generating an electrical clock output control signal from the received optical input data signal in a clock recovery arrangement, wherein the electrical clock output control signal comprises both a frequency corresponding to a bit data rate of the optical input data signal and a predetermined phase modulation depth and phase;

(c) modulating the phase of the optical input data signal received in step (a) in a phase modulator in accordance with the electrical clock output control signal generated in step (b), wherein the phase of the electrical clock output control signal is 90 degrees from that of the optical input data signal, and generating an optical output signal wherein a phase of the data signal change associated with each data bit is delayed by a predetermined amount; and (d) introducing a predetermined amount of dispersion to data pulses in the optical output signal from the phase modulator by a dispersive unit for generating an output optical signal from the compensation arrangement wherein the data signal changes for each data bit is compensated for.

16. The method of claim 15 wherein in performing step (b), performing the steps of:

(b1) converting the optical input data signal into a corresponding electrical output signal in a photodetector wherein a digital pulse is generated for each bit of data in the optical input data signal;

(b2) receiving the electrical output signal from the photodetector in a clock recovery circuitry and generating a clock output signal having a frequency corresponding to the bit data rate of the optical input data signal;

(b3) receiving the clock output signal from the clock recovery circuitry in an amplifier and generating an amplified output signal having a predetermined amplitude that corresponds to a predetermined phase modulation depth; and (b4) receiving the amplified output signal from the amplifier in a phase shifter and introducing a predetermined phase shift therein for generating the electrical clock output control signal for the phase modulator comprising both a frequency corresponding to a bit data rate of the optical input data signal and a predetermined phase modulation depth and phase.

17. The method claim 15 wherein in performing step (d), performing the step of introducing the predetermined amount of dispersion to the data signal changes in the optical output signal from the phase modulator by the dispersive unit comprising a predetermined length of an optical fiber including a predetermined amount of dispersion.

18. The method claim 15 wherein in performing step (d), performing the step of introducing the predetermined amount of dispersion to the data signal changes in the optical output signal from the phase modulator by the dispersive unit comprising a chirped optical fiber Bragg grating.

19. The method of claim 15 wherein data signal change compensation is performed at the speed of the bit data rate of the received optical input data signal.

20. The method of claim 15 wherein the electrical clock output control signal generated in step (b) is independent of any data signal change measurement obtainable from the received optical input data signal.

21. The method of claim 15 wherein the electrical clock output control signal generated in step (b) is independent of any dynamic data signal change value in the received optical input data signal.

* * * * *